United States Patent [19]

Staar

[11] Patent Number: 4,791,626

[45] Date of Patent: Dec. 13, 1988

[54] AUTOMATIC CHANGER FOR PLAYER/RECORDER OF OPTICAL MAGNETIC DISCS AND CARDS

[75] Inventor: Marcel J. H. Staar, Brussels, Belgium

[73] Assignee: Staar Development Company S.A., Brussels, Belgium

[21] Appl. No.: 105,027

[22] Filed: Oct. 6, 1987

[30] Foreign Application Priority Data

Oct. 6, 1986 [BE] Belgium .................................. 217263
Dec. 30, 1986 [BE] Belgium .................................. 217657

[51] Int. Cl.⁴ .................................................. G11B 17/24
[52] U.S. Cl. ............................................................ 369/37
[58] Field of Search ........................ 369/36, 37, 38, 39

[56] References Cited

U.S. PATENT DOCUMENTS

| | | | |
|---|---|---|---|
| 3,165,321 | 1/1965 | Osbourne et al. | 274/10 |
| 3,555,509 | 1/1971 | Arsem | 340/162 |
| 3,722,892 | 3/1973 | Hoake . | |
| 3,786,475 | 1/1974 | Staar | 340/324 |
| 3,967,828 | 7/1976 | Topdski | 274/10 |
| 4,113,366 | 9/1978 | Glover | 352/8 |
| 4,344,162 | 8/1982 | Foufounis | 369/37 |

Primary Examiner—Steven L. Stephan
Attorney, Agent, or Firm—Leydig, Voit & Mayer

[57] ABSTRACT

A player/recorder apparatus with an automatic changer mechanism for information carriers in the form of cards or discs. An arcuate magazine stores a plurality of information carriers in multiple compartments extending radially from a center, each compartment being adapted to store an information carrier in a storage position in a radial plane relative to the center. One or more player/recorder devices for supporting an information carrier in an operating position are spaced circumferentially from the arcuate magazine. A symmetrical rotary changer is mounted for angular rotation about the center so as to be positionable in alignment with the entrance of any one of the compartments or of any one of the player/recorder devices, the rotary changer having a member for shuttling an information carrier by movement edgewise in its own plane between a storage position in a magazine compartment and a transition position on the rotary changer and between the transition position on the rotary changer and the operating position in the player/recorder devices, the rotary changer being angularly rotatable through at least 180° to permit reversal of the sides of an information carrier in the transition position.

12 Claims, 4 Drawing Sheets

FIG. 13

AUTOMATIC CHANGER FOR PLAYER/RECORDER OF OPTICAL MAGNETIC DISCS AND CARDS

TECHNICAL FIELD

This invention relates to an apparatus for the automatic selection and manipulation of information containing data, for example, digital, optical, or magnetic, contained on individual carriers in the form of cards or discs.

SUMMARY OF THE INVENTION

The principal object is to provide a very simple, economically realized system of high performance, which is easy to use.

Another object is also to provide a system which permits the simple introduction and removal of an information carrier while substantially excluding dust and other pollutants from the internal environment of the enclosure.

Another object is to provide means by which the possibility of error in storage locations may for all intents and purposes be eliminated.

To attain these ends, the apparatus includes a fixed or arcuate magazine, and a fixed player/recorder positioned adjacent the magazine, located in generally a circular arrangement about the same center axis, and a rotary changer pivoting in the center of the circle formed by the arcuate magazine and the processing unit.

In pivoting, this changer may access any angular position, grasp an information carrier, and pivot to any other angular position in order to position it there.

Means are also provided to enable the insertion or removal of an information carrier from the unit through an opening communicating with a waiting or transfer location within the magazine itself, or with a chamber situated in the vicinity of and on the same axis as that of the magazine.

For certain specific usages, it is also an object to provide several player/recorder devices in order to save time when playing successively selected data found on different information carriers or also, for example, for the continuous playing of musical tunes, going from one tune to the next in a cross fade, or also to be able to read information from one information carrier and to transfer and record the information at the same time onto another.

Provision is made, therefore, to be able to position several player/recorder devices in conjunction with a fixed magazine, and served by a single rotary changer.

For a better understanding of the invention, examples of it are described hereinafter.

BEST MODES FOR CARRYING OUT THE INVENTION

Figure 1:
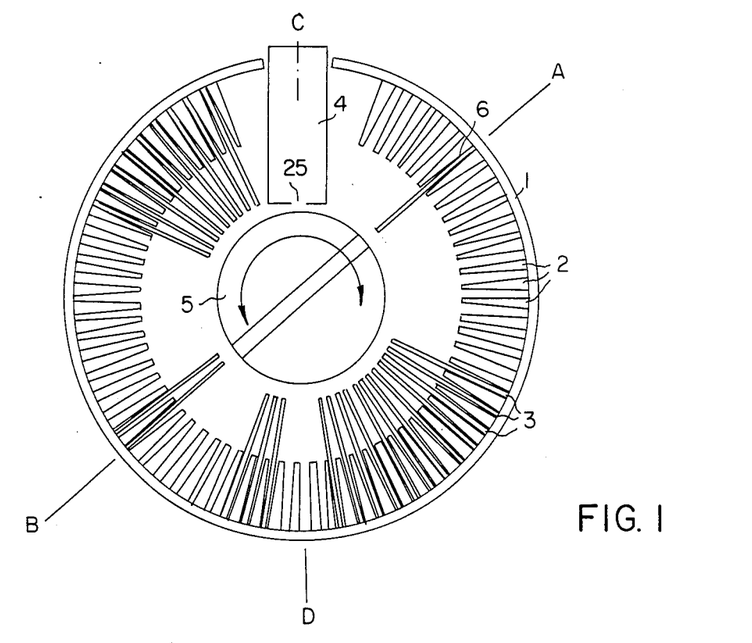
FIG. 1 is a plan view of an apparatus according to the invention.

In a top view, FIG. 1 shows a fixed arcuate magazine 1, provided with multiple compartments 2 in which discs 3 may be positioned, the compartments extending radially from the center of the unit, each disc containing optical data in digital form, for example.

A fixed player/recorder 4, as for example of the type shown in FIG. 4 and described later, is positioned circumferentially spaced from the magazine and substantially the same distance from the center, to receive discs from the magazine.

A rotary changer 5 pivots in the center of the unit and has means for shuttling a disc to and from the rotary changer 5. The fixed arcuate magazine 1 and fixed player/recorder 4 are mounted in a generally circular arrangement about the center.

It can, therefore, be seen that the rotary changer 5 can rotate into alignment with the entrance to a compartment in the magazine containing a disc 6, remove it, and pivot it by approximately 50° with respect to the entrance to the player/recorder 4 in order that it may insert it into the latter.

After a playing operation, the disc may be returned to the rotary changer which, by pivoting, aligns the disc with, and by the shuttling means inserts the disc into, a selected compartment in the magazine.

The rotary changer provides means for shuttling an information carrier from any angular position in the magazine and positioning it at any other angular position and for inserting the carrier in the player/recorder 4 and/or for returning it to the magazine in the same or a different compartment.

While the arcuate magazine 1 is fixed against rotation, it may be removable axially to allow a set of the information carriers to be replaced by a new set. By "fixed" is meant fixed against rotation, although it may be releasably locked in the equipment and may be removable.

Figure 2:
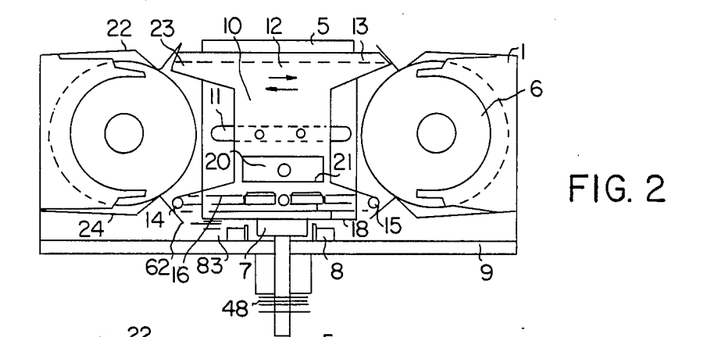
FIG. 2 is a schematic view taken essentially as a sectional view in the plane of lines A—B of FIG. 1.

The rotary changer 5 is driven in rotation preferably by a stepping motor whose rotor 7 is of one piece with the pivoting axis of the changer and whose stator 8 is of one piece with fixed chassis 9.

For shuttling an information carrier such as a disc to and from the rotary changer 5, a slide block provides a shuttle member 10 which is guided by a pin and groove 11 on the body of the changer in order to be able to take the shifted position in accordance with the arrows 12.

The upper edge of this shuttle member 10 forms an inverted U-shaped groove 13, in which the edge of the disc may be inserted and rolled.

The lower edge of shuttle member 10 is provided with rollers 14, 15 so that a rubberized belt 16 may be stretched over the hubs of the rollers, forming a conveyor belt.

The assembly is powered by a motor 17 fixed on the rotary changer body and whose rubberized axle 18 drives the belt 16 in either direction.

Figure 5:
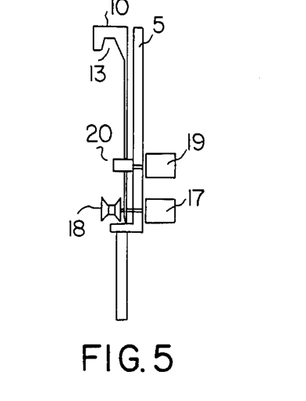
FIG. 5 is a fragmentary view of the rotary changer shuttle of the apparatus.

The shuttle member 10 is moved in the direction of the arrows 12 by a motor 19 operating a drive gear 20 engaged in gear rack 21 formed in the shuttle member, FIG. 5.

The discs are resiliently retained in the magazine compartments by spring leaves 22, 24.

When the shuttle member 10 is centered, the rotary changer may turn freely, without touching the magazine or the discs.

When stopped in front of an entrance to a compartment in the magazine, the shuttle member 10 may be moved in one direction or the other toward the disc.

The edge of the upper arm 23 of the shuttle member 10 first pushes back leaf 22, and the edge of roller 14 pushes back leaf 24. At the same time, the edge of the disc is pinched between the groove 13 in the shuttle member 10 and the rubberized belt 16 on the hub of roller 14.

Motor 17 powers the conveyor belt and the disc is moved to the center of the shuttle member and motor 17 stops.

Figure 3:
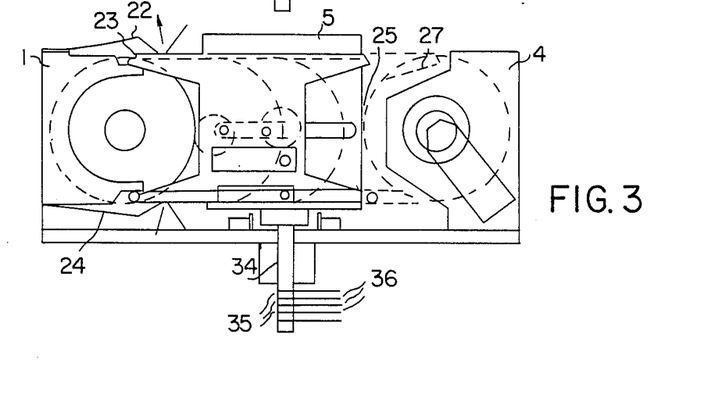
FIG. 3 is a diagrammatic view taken essentially in the plane of lines C—D of FIG. 1.

At the same time, motor 19 has recentered the shuttle member in the center of the rotary changer, and the latter, with the disc which it carries, may again freely turn and stop, for example, in front of an entrance 25 to player/recorder 4, FIG. 3.

Figure 4:
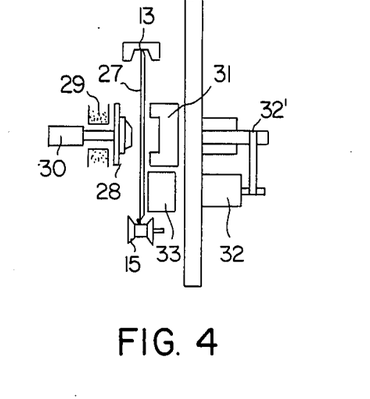
FIG. 4 is a fragmentary view illustrating in diagrammatic form the construction of a player/recorder device of the apparatus.

FIG. 4 shows an example of a player/recorder in which a disc may be moved to process the digital optical data which it carries.

It may be seen in FIG. 3 that a disc is extracted by the movement of the shuttle member 10 toward magazine 1, and that its movement toward player/recorder 4 will enable the groove 13 and the roller 15 to place a disc 27 in the neighborhood of the drive components.

A tapered spindle 28, moved, for example, by the magnetic field of a coil 29 acting on an iron core 30, centers the disc and places it on a turntable 31 powered by a motor 32 and a belt 32'.

At this moment, the shuttle member 10 is moved in the reverse direction, and the groove 13 and the roller 15 are withdrawn, and the released disc may turn freely.

The data is written and read by a processing system 33, for example, a low-powered laser beam whose system of associated lenses enables the tracks of the disc to be accessed and scanned. There are a number of these systems and they are well-known, and need not be described for a proper understanding of the invention.

Moreover, this processing system 33 may also be, for example, a magnetic recording and read head capable of processing other types of discs.

The electrical components found in the rotating changer may receive power through the wires passing through hollow axle 34 connected to insulated rings 35 placed in contact with brushes 36, or by other equivalent means.

The rotation of the rotary changer may be limited to about 360°, in either direction, in order to be able to quite simply connect the electrical components of the changer through a loop or turn of wires which can follow the movements of the changer.

Figure 6:
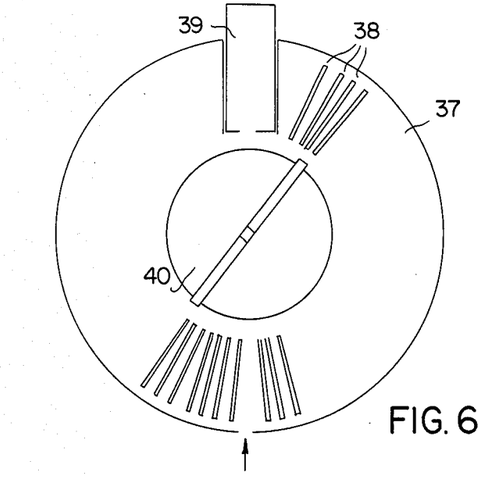
FIG. 6 is a plan view, similar to FIG. 1, of an alternative form of the invention applicable to cards stored in a magazine.
Figure 8:
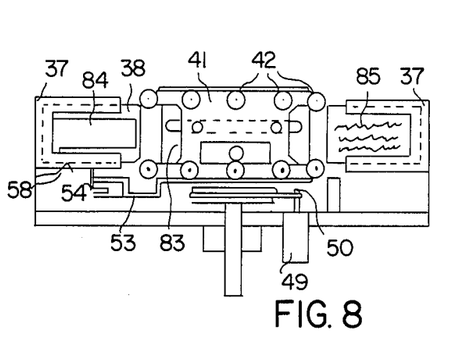
FIG. 8 is a diagrammatic view taken essentially as a sectional view diagonally through the magazine and rotary changer of FIG. 6.
Figures 9A, 9B:
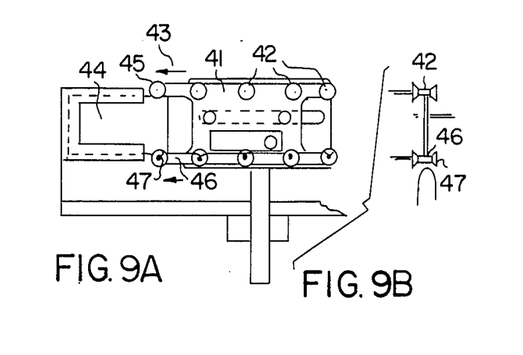
FIGS. 9A and 9B, respectively, are fragmentary views of a rotary changer and magazine compartment of the apparatus as shown in FIG. 6 and a detail view in further elevation of the shuttle mechanism of the rotary changer.

FIGS. 6, 8, and 9 show an example of the system adapted for cards bearing optical, magnetic, or electronic data.

A fixed magazine 37 has radially extending compartments to receive the cards 38, and a processing unit 39 is mounted in a fixed position, for example, circumferentially spaced from the stored card in a gap between the opposed ends of the arcuate magazine 37.

When these processing units have a sufficiently long entry passage, the axis of the units is found to be approximately the same radial distance from the center axis of the apparatus as the stored cards.

The fixed magazine and processing unit are served by a rotary changer 40.

In the cross-sections shown in FIGS. 8 and 9, it may be seen that the rotary changer is similar to that shown in FIGS. 2 and 3 for discs, but the shuttle member 41 is provided with the idler rollers 42 instead of the inverted U-shaped passage 13.

In this manner, referring to FIGS. 9A and 9B, when the shuttle member 41 is moved in the direction of the arrow 43, toward the card 44 in the magazine, the card is pinched between the roller 45 and the rubberized belt 46 on roller 47, and the card may be carried along the conveyor belt, guided by roller 42.

It was said earlier that the rotary changer is preferably powered by a stepping motor 7, 8, FIG. 2, 3. A control unit is provided including counters to register the steps of the motor as it moves the rotary changer, and thereby keep track of the rotary position of the changer relative to the magazine and player/recorder devices.

In order to be able to determine the exact absolute angular position of the rotary changer at all times, and, therefore, the magazine compartment which it is in front of, there is provided in the illustrated embodiment, of one piece with it, an encoder 48, whose reference is the fixed chassis 9.

Such an encoder, connected to the counters in the control for the stepping motor, is very varied and well-known, and consists generally of calibrated sectors or divisions whose positions are read by photocells.

An example of a continuous movement motor 49 driving the rotary changer with a belt 50 can be seen in FIG. 8.

Figure 7:
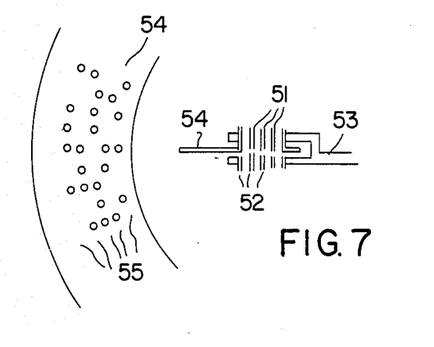
FIG. 7 is a fragmentary view illustrating optical sensing of the position of the rotary changer.

In this case, in order to determine the angular positions, a series of photocells 51 with their light sources 52 mounted on a clip 53 all of one piece with the rotary changer has been provided, FIGS. 7, 8.

In turning, the cells scan an edge 54 which is of one piece with the stack 37.

This edge is coded for each angular position, consisting of 55 points which may or may not be transparent, in order that the cells may detect each time a combination corresponding to a determined location.

The cards 38 may be held in the magazine 37 by leaf springs equivalent to leaves 22, 23, 24 used to retain the discs (FIGS. 2, 3), and separated at the time of the extraction of a card from the stack, but a leaf spring 56 may also be provided in order to hold the cards in the stack by slight pressure, which may be easily overcome when a card is extracted from or reinserted in its location.

A chamber has been provided for loading and unloading in order to insert the information carrier into the magazine without also allowing entry of dust or other pollutants into the enclosure, to decrease positioning errors in the storage and to avoid manual contact with the components of the unit.

Figure 10:
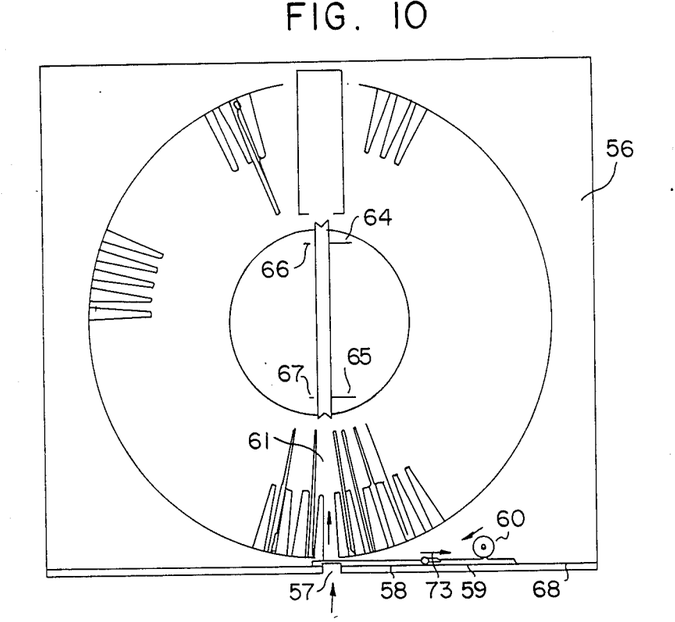
FIG. 10 is an illustration of the apparatus in an enclosure or housing having an entrance slot for the introduction of discs into the unit.

FIG. 10 shows the unit of FIG. 1 mounted in a dust-proof enclosure or housing 56.

An opening 57 is normally sealed by a sliding door 58 containing the teeth of a gear rack 59, in which the gear of the motor 60 may turn in one direction or the other, in order to open or close the opening 57.

A chamber 61 has been provided with respect to this opening, which may simply be one of the magazine compartments reserved for that purpose and having an outside opening which may be located in alignment with the housing opening 57.

Figure 11:
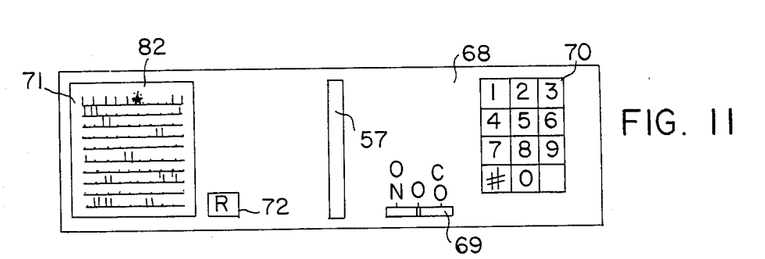
FIG. 11 is a front view of the apparatus as illustrated in FIG. 10.

FIG. 11 shows the face of the enclosure and shows an example of the unit controls.

Figure 12A:
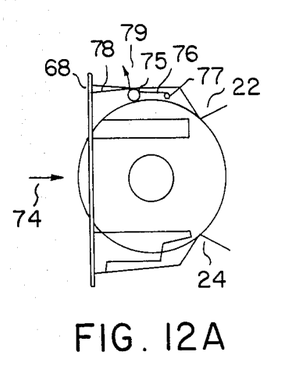
FIGS. 12A, B, and C are detail views illustrating the latch mechanisms for holding a disc within a compartment of the magazine.

FIG. 12 shows a cross-section of the compartment 61.

The spring leaves 22, 24 take different positions depending on whether a disc is present in the compartment of the magazine 1 (FIG. 2).

Edge 62 of leaf 24 will or will not have an effect on a photocell 63 with its light emitter, of one piece with the changer, depending on whether the edge reflects the light, determining whether a location is occupied.

Photocells 64, 65, with their light emitters 66, 67, mounted on this changer (FIG. 10), sense the position of an information carrier with respect to the center of the changer.

The applications of the apparatus are quite varied and each require specific electrical circuits with respect to the controls of the components depending on the cycle. Therefore, it is not possible to describe all of the combinations, but by way of example, a complete cycle and the functions of the components intended to reproduce the data on optical discs is given hereinafter.

Control panel 68 includes an opening 57, a 3-position inverter 69, a keyboard 70, a display board 71, and a reject button 72.

When the inverter is put in position C-D, namely the loading or unloading position, gear 60 engages the gear rack in the direction of the arrow 73, and a disc may be inserted in the magazine compartment 61 through opening 57.

FIG. 12 shows a cross-section of this location, which has appreciably the same dimensions as that of a storage location in the magazine 1.

When a disc is inserted in the direction of arrow 74, the edge of the disc pushes back a roller 75 held by a clip 76 pivoting on a support 77 against a spring 78, in the direction of the arrow 79.

Figure 12B:
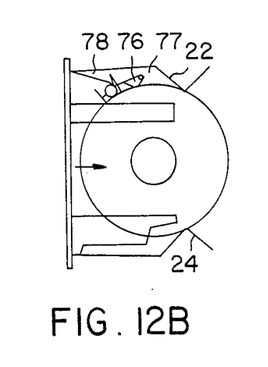

When the disc has been pushed sufficiently far into the magazine, roller 75 has gone past the center of the disc and, under the action of spring 78, completes the movement by pushing the disc against the leaves 22, 23, 24, FIG. 12B, in a position which is essentially the same as that of the stored discs, and entrance 57 is again closed.

In the meantime, the changer has made a complete inspection of itself and detects, by means of photocell 63, whether it is occupied or vacant, showing the inventory on a screen of the liquid crystal type 71, for example, and the changer stops, waiting, before the compartment 61.

By means of keyboard 70, the user may then choose a vacant compartment.

The changer shuttle member immediately moves to remove the disc from the compartment 61, as described in FIG. 3, and places it in the middle of the changer in a transition position.

When cells 64, 65 have detected the centering of the disc in the shuttle member and that of the shuttle member in the changer, the latter turns to the chosen angular position and inserts the disc.

To remove a disc, the user enters the number corresponding to a stored disc indicated on board 71 through the keyboard 70, and the changer takes the disc from this storage compartment, pivots it, and reinserts it into compartment 61.

Figure 12C:
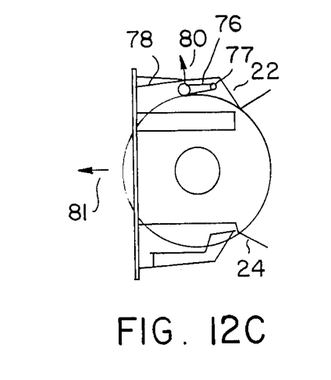

The edge of the disc pushes against roller 75 in the direction of arrow 80 until the roller is directly above the center of the disc, and the disc is held in that position momentarily, and may be withdrawn manually in the direction of arrow 81, FIG. 12C.

When the multipoint switch is put in the "ON" position, a selection may be made on the keyboard 70.

The changer may, therefore, come to position itself in front of the chosen compartment, remove the disc, pivot it, and insert it into the player/recorder 4, FIGS. 2, 3.

This position is retained in memory in order to return the disc to its compartment after the data it contains has been processed.

During the handling and processing of a disc, its number may blink (82), for example, so that it may be identified on the display board 71.

In the event that several discs and tracks on the discs must be formulated in advance, a selector may be used, for example, as described in U.S. Pat. No. 3,786,475, in which the list of information carriers and tracks selected, being processed, or waiting are permanently displayed in order.

Board 71 may, therefore, be used to automatically display the selections made while switch 69 is in the "ON" position.

The quantity of data which may be placed on an optical medium is enormous, and in the discs on the market, one portion or one track is provided and already recorded in order to give the references, titles, program, or summary concerning the recordings it contains.

Board 71 may, therefore, be used to display all of the data at the moment in which the disc identification track is accessed on its reentrance in the processing unit.

One may display, for example, the title and author of a musical tune while it is being heard.

For identification not found on the information carriers, it may be entered in memory in the usual fashion through a separate alphanumeric keyboard. Each time that an information carrier is selected, its storage number identifies the corresponding information in memory, which can be displayed on screen 71.

As seen in FIG. 2, in accordance with the invention, preferably the rotary changer is symmetrical about a vertical line bisecting the rotary changer and is double ended to permit an information carrier to be received or delivered from either end. The information carriers have an axis of symmetry which bisects the disc or card support for the recorded data, and the rotary axis of the rotary changer coincides with the axis of symmetry of the card or disc when in the transition position on the rotary changer.

Therefore, either end of the rotary changer may be presented to the magazine 1 or the player/recorder 4, and the end-wise position of a card, or the recorded side of a disc, received through one end of the rotary changer, may be reversed if desired by rotating the rotary changer angularly through 180°, and then the card or disc may be delivered through the other end of the rotary changer. Thus, an information carrier incorrectly introduced into the magazine in reversed position or with the undesired side aligned with the recorder/player, may be reversed to the desired position by manipulating the rotary changer under direction of the control unit.

The type of information carriers may control reversal.

As an example, a photocell and its light emitter 83, FIG. 8, have been provided, mounted on the rotary changer on the card passage 38.

One side of the card has a metalized, bright, smooth surface 84, on which the digital information is encoded, and the other side 85, contains writing or printed text.

During the movement of the card in the changer, the photocell, detecting either a smooth surface or a surface covered with writing, signals the control unit which decides on whether to reverse the position of the changer by 180°, in order to present the proper side of the card to the player/recorder.

This correction may also be made upon extracting the card from the entry location in order to store the card in the proper direction.

When two sides of a disc are used, for example, and there is no easy way to identify the sides, one must wait until the disc is inserted in the reader when by playing the identification track it may be discovered whether there is an error.

Should that be the case, the disc is returned to the changer which, after a 180° rotation, reintroduces the disc to the processing unit in the proper direction.

Figures 13, 14, 15:
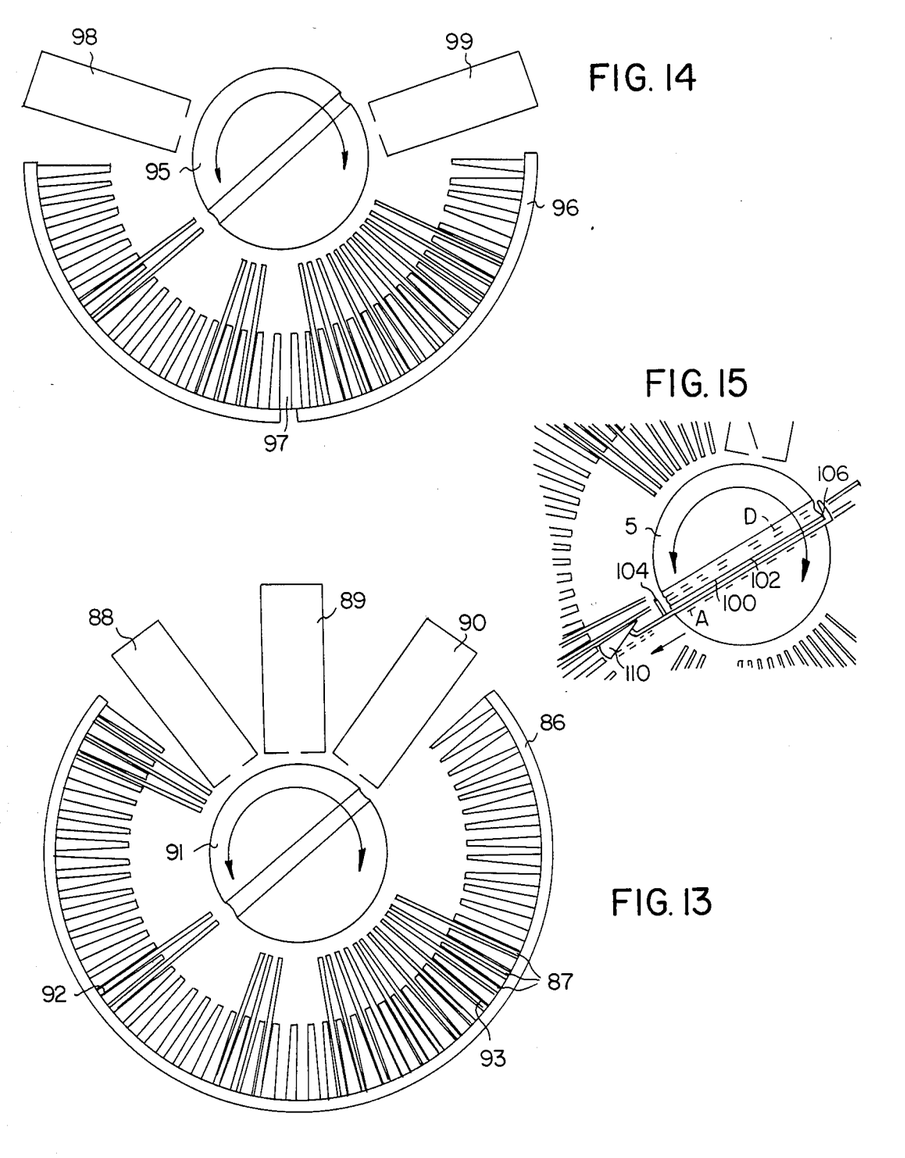
FIGS. 13 and 14 are plan views of an alternative embodiment having a plurality of player/recorder devices.
FIG. 15 illustrates a disc retainer on the rotary changer.

FIGS. 13 and 14 show an alternative embodiment with plural player/recorder devices.

FIG. 13 shows an arcuate magazine 86 in which discs 87 may be stored.

Three player/recorders 88, 89, 90 have been positioned circumferentially spaced from the stored discs in the magazine and it may be seen, therefore, that the rotary changer 91 can be positioned aligned with any disc location and any processing unit.

In this way the rotary changer may, for example, take a disc 92 from the magazine and issert it into the player/recorder 88 and, during the processing of this selection, the rotary changer can at the same time take disc 93 and insert it in a second player/recorder 89, so that this second selection can be processed without any loss of time.

In the meantime, the rotary changer may also have taken disc 94, and inserted it into a third player/recorder 90.

As soon as the processing of a selection is completed, the rotary changer withdraws the disc and returns it to its place in the magazine. The freed-up player/recorder may then receive the waiting, following selection, if any.

The number of player/recorders will determine the complexity of the electronic logic memory circuits which take into account the specific selection logic to be applied to each case.

FIG. 14 gives an example of a unit of smaller dimensions to be used, for example, for playing musical tunes continuously.

Rotary changer 95 serves magazine 96, a loading and unloading chamber 97, and two player/recorders 98, 99.

When a selection is made, a disc is taken by the rotary changer, which inserts it in player/recorder 98, and playback of sound begins.

During this time, the rotary changer may simultaneously insert another disc in player/recorder 99, which is held in waiting.

As soon as the playing of the disc in player/recorder 98 is completed, the playing of the disc in player/recorder 99 may begin immediately.

If so desired, an automatic system may be arranged which progressively decreases the volume of one player/recorder and progressively increases the volume of the other, in order to obtain a cross fading of a musical program without interruption.

As soon as a player/recorder becomes free, it may receive a new, waiting selection.

Depending on the specific application of the unit, the player/recorders may be grouped in a single block placed in a circle formed by the magazine storing the information carriers, or formed of individual units distributed in a circular arrangement with the arcuate magazine.

As shown in FIG. 15, a retainer means is provided for securing a disc D on the rotary changer, herein illustrated as an elongated retainer member 100 having legs 104, 106 at the opposite ends and pivotably mounted to the shuttle member 10 at the center 102 of the retainer member 100. The retainer member 100 resiliently holds the legs 104, 106 at opposite ends of the shuttle member 10 so as to block both entrances to the rotary changer and thereby retain a disc in its transition position on the rotary changer as it turns to align with the player/recorder devices or magazine compartments. When the shuttle member 10 is moved toward the player/recorder or the magazine to extract or deposit a disc, as shown for example in FIG. 3, the retainer member 100 movable in the direction of the arrow in FIG. 15 is pivoted by coaction with a cam member 110 on the magazine to a position illustrated in dashed lines A in FIG. 15 thereby opening the entrance to the rotary changer and allowing transfer of a disc or card between the magazine and the rotary changer shuttle. Upon return of the shuttle member 10 to its central position on the rotary changer 10, the legs 104, 106 of the retainer member are allowed to return to the latch or retain position under the slefrestoring action of the retainer member or separate resilient retainer means.

I claim:

1. A player/recorder apparatus including an automatic changer mechanism for information carriers in the form of cards or discs, said apparatus comprising:
    magazine means for a plurality of information carriers including a fixed arcuate magazine formed about a center and having multiple compartments extending radially from the center,
    player/recorder means for supporting an information carrier in an operating position spaced circumferentially from said magazine means and in a radial plane relative to the center, a symmetrical rotary changer means mounted to rotate angularly about an axis substantially coincident with the center and positionable in alignment with any one of said compartments or with the operating position in said player/recorder means, said rotary changer means having information carrier transfer means on opposite ends thereof for shuttling an information carrier by movement edgewise in its own plane to and from said rotary changer means through either of the opposite ends thereof between a storage position in a magazine compartment and a transition position on said rotary changer means and between the transition position on said rotary changer means and the operating position in said player/recorder means, said rotary changer means being mounted to rotate angularly through at least 180° to reverse sides of an information carrier supported by said rotary changer means before transfer of an information carrier to said magazine or said player/recorder means from said rotary changer means.

2. The player/recorder apparatus according to claim 1 including an automatic changer mechanism for information carriers in the form of cards or discs, which carry information stored on magnetized or reflective surfaces on a support member and have an axis of symmetry which bisects the support member, and wherein said symmetrical rotary changer means includes means for retaining a card or disc in a transition position in which the axis of rotation of the rotary changer coincides with the axis of symmetry of the card or disc support member.

3. The player/recorder apparatus according to claim 1 in which the information carrier has an axis of symmetry and when the information carrier is in the transition position on said rotary changer means the axis of symmetry of the information carrier substantially coincides with the axis of rotation of said symmetrical rotary changer means.

4. The player/recorder apparatus according to claim 1 wherein said player/recorder means includes a plurality of player/recorder devices for carrying an information carrier in an operating position spaced from said magazine means and in a radial plane relative to the center, said player/recorder devices being located with said arcuate magazine in a generally circular arrangement about the center.

5. The player/recorder apparatus according to claim 1, said rotary changer means including a stepping motor for rotating said rotary changer means, and counters for controlling angular movement and aligning said rotary changer means with selected compartments of said arcuate magazine and said player/recorder means.

6. The player/recorder apparatus according to claim 1, said rotary changer means including optical position detector means for controlling angular position, including a disc mounted for rotary movement with said rotary changer means, and optical sensing means for sensing the position of said disc to determine the angular position of said rotary changer means.

7. The player/recorder apparatus according to claim 1 wherein said rotary changer means includes a body and a movable shuttle member carried by said body into a position adjacent an entrance of a compartment of said arcuate magazine or of a player/recorder means, and movable conveyor means carried by said shuttle member into engagement with an edge of an information carrier and imparting motion to the information carrier to move the information carrier to and from said rotary changer means.

8. The player/recorder apparatus according to claim 7 wherein said means for shuttling an information carrier includes an electric motor mounted on said rotary changer means, and a rubber belt carried by said shuttle member which engages an edge of an information carrier and imparts motion to the information carrier to move the information carrier to and from said rotary changer means.

9. The player/recorder apparatus according to claim 1 wherein said magazine means includes releasable means for holding an information carrier in each magazine compartment.

10. A player/recorder apparatus including an automatic changer mechanism for information carriers in the form of cards or discs, said apparatus comprising:

magazine means for a plurality of information carriers including a fixed arcuate magazine formed about a center and having multiple compartments extending radially from the center, each compartment being adapted to store an information carrier in a storage position in a radial plane relative to the center and each compartment having an entrance facing the center through which an information carrier moves edgewise in its own plane, a plurality of player/recorder devices, each having means for supporting an information carrier in an operating position spaced circumferentially from said magazine means and in a radial plane relative to the center, each of said player/recorder devices having an entrance facing the center through which an information carrier moves edgewise in its own plane, said player/recorder devices being located with said arcuate magazine in a generally circular arrangement about the center, and a rotary changer means mounted for pivoting about the center so as to be positionable in alignment with the entrance of any one of said compartments or of said player/recorder devices, said rotary changer means having means for shuttling an information carrier by movement edgewise in its own plane to and from said rotary changer means between a storage position in a magazine compartment and a transition position on said rotary changer means and between the transition position on said rotary changer means and the operating position in any one of said player/recorder devices.

11. A player/recorder apparatus including an automatic changer mechanism for information carriers in the form of cards or discs, said apparatus comprising:

a fixed arcuate magazine having a plurality of radially extending compartments, a player/recorder means providing an operating position in a radial plane spaced circumferentially from said arcuate magazine, said magazine and player/recorder means being mounted in a generally circular arrangement about a common center, a symmetrical rotary changer means mounted to rotate angularly about an axis substantially coincident with the center, said rotary changer means having a body and a movable shuttle member supported by said body for movement radially relative to the center to extend from either end of said body and provide a transfer position when the shuttle member is extended, said shuttle member having information carrier transfer means on opposite ends thereof for shuttling an information carrier by movement edgewise in its own plane to and from said shuttle member through either of the opposite ends thereof when said shuttle member is extended, and retainer means for retaining an information carrier in a transition position on said rotary changer means substantially midway between the opposite ends thereof.

12. The player/recorder apparatus according to claim 11 wherein said movable shuttle member includes means cooperating with fixed cam means adjacent said magazine to release said retainer means responsive to movement of said shuttle member to extend from either end of said body, and allow an information carrier to move from the transition position and be transferred from said rotary changer means.

* * * * *